May 22, 1962 C. F. OESTERMEYER ETAL 3,036,140
DEFERRED ACTION BATTERY
Filed Sept. 16, 1954

INVENTORS
Carl F. Oestermeyer
Robert M. Raney
Herold L. Koenig
Howard T. Havlick
Hudson Boughton
BY Williams, David & Hoffmann
attorneys United States Patent Office 3,036,140
Patented May 22, 1962

3,036,140
DEFERRED ACTION BATTERY
Carl Fred Oestermeyer, Shaker Heights, Robert M. Raney, Euclid, Herold L. Koenig, Novelty, and Howard T. Havlick, Willoughby, Ohio, assignors to The Electric Storage Battery Company, Philadelphia, Pa., a corporation of New Jersey
Filed Sept. 16, 1954, Ser. No. 456,550
16 Claims. (Cl. 136—90)

This invention relates to improvements in a deferred action battery; that is to say, a battery which is normally unactivated but may be quickly activated whenever conditions require its use.

One of the objects of the invention is the provision of a novel and improved battery unit of the character referred to including an evacuated battery container and a separate container for the electrolyte which normally maintains the electrolyte out of connection with the battery but is so constructed and arranged as to quickly discharge its content into the battery when activation is desired.

Another object of the invention is the provision of a novel and improved battery unit of the character referred to comprising a flexible electrolyte container collapsible by pressure; for example atmospheric pressure, to force the electrolyte into the battery.

Another object of the invention is the provision of a novel and improved battery unit of the character referred to comprising a passage between the conduit interconnecting the electrolyte and the battery containers including a partition normally preventing electrolyte flow from the electrolyte container to the battery container, in combination with a dart or the like operated through a flexible or otherwise movable part of the conduit by means including an external electric current for puncturing or otherwise disabling said partition.

A further object of the invention is the provision of a novel and improved battery unit of the character referred to comprising an evacuated housing enclosing the evacuated battery, whereby double insurance against pressure leakage into the battery is obtained.

Still another object of the invention is the provision of a novel and improved battery unit of the character referred to comprising an outer housing enclosing the inner housing and the battery, the outer housing containing air under pressure; for example, atmospheric pressure, preferably sea level pressure, said electrolyte container being enclosed in said outer housing and the latter housing sealed whereby the same pressure for collapsing the electrolyte container will be available at whatever height above the earth the unit may be set in operation.

Another object of the invention is the provision of a novel and improved battery unit of the character referred to comprising means operated by outside electricity for heating the battery and the electrolyte container and for controlling the operation of said heaters to bring about predetermined temperatures in the battery and electrolyte.

Another object of the invention is the provision of a novel and improved battery unit of the character referred to comprising means for evacuating the inner housing through the intermediacy of the battery container so that a single exhaust connection can be made, the exhaust connection between the battery container and the inner housing comprising a check valve which prevents electrolyte from entering the housing when flow of the electrolyte to the battery is established.

Another object of the invention is the provision of a novel and improved battery unit of the character referred to comprising electrical means for testing or determining the degree of vacuum present in the inner can and hence in the battery.

Other objects and features of novelty will appear as we proceed with the description of that embodiment of the invention which, for the purposes of the present application, we have illustrated in the accompanying drawing, in which FIG. 1 is a plan view of a battery unit embodying the present invention, the cover of the outer housing being removed and certain of the parts being shown in section to better illustrate the invention;

Figure 1:
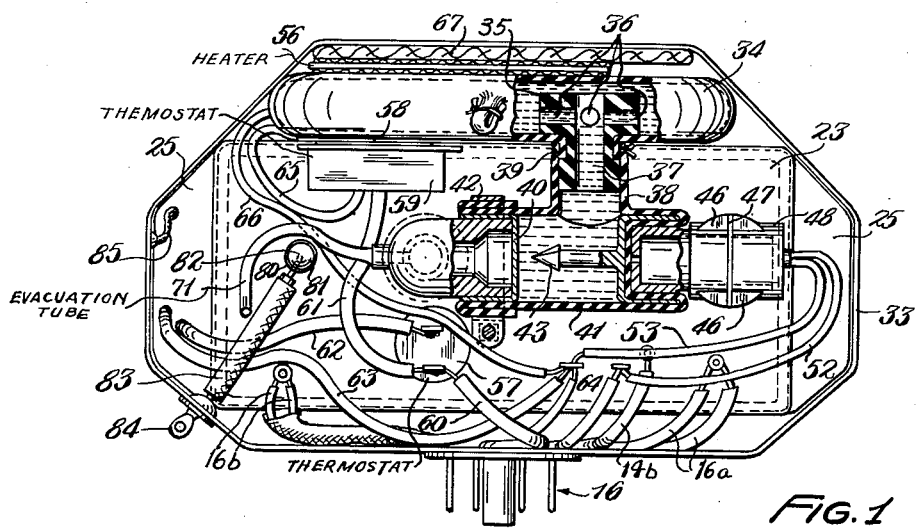

The battery unit shown comprises a battery container having side and bottom walls 10 and 11 which are impervious to the action of electrolyte. The battery container also includes a series of dividers or partitions 12 which separate the container into a plurality of battery cell compartments. Battery plates and separators are disposed within the various cell compartments and are electrically connected internally in a conventional manner. A cover 13, which may be of the same material as the said bottom walls 10 and 11 and partitions 12, is sealed throughout its periphery to the side walls 10 and the partitions 12. The cover has perforations 14 and 15 through which electrical conductors extend from the terminals of the battery to a plug 16, it being understood that the joints between the conductors and the battery cover are effectively sealed. Through the plug 16 any circuits which it is desired to have the battery energize may be readily connected. Dual conductors 16a extend from one side of the battery to one or two selected terminals or prongs of plug 16, while dual conductors 16b extend from the other side of the battery to one or two additional terminals or prongs of plug 16. Conductors 15a and 15b interconnect the sides of the battery with the terminal posts from which conductors 16a and 16b extend. The conductor 14a provides a further connection to the battery, and conductor 14b extending through can cover 23 is a continuation of conductor 14a and terminates at a terminal or prong of plug 16. The cover 13 has a series of ports 17 extending therethrough, each port being in communication with one of the cells of the battery. The ports 17 are covered by an elongated manifold 18 having a lengthwise passage 19 by means of which all of the ports are put in communication with each other. On its under side the manifold has a rim 20 which engages the surface of the cover and is sealed thereto throughout its extent. The battery with its cover 13 and manifold 18 is placed within an inner metal container or can having a base 21 and integral side walls 22. Over the side walls and spaced a substantial distance above the battery there is a metal cover 23 which is sealed to the side walls 22 and is provided with downturned ends 24 embracing the end walls and with end flanges 25 which serve to steady the inner can in the unit, as will presently appear.

The rim 20 at the under side of manifold 18 is extended on one side to form a semi-circular portion 27 within which is mounted and sealed a circular collar 28. A rubber gasket 29 is mounted tightly within this collar, and through it there extends a constricted end 30 of an elbow fitting 31 that is sealed to the cover 23 of the can. This fitting constitutes part of an electrolyte passage which communicates with the manifold 18 and thus with each of the ports 17 to the various cells.

The inner can with its contents is mounted within an outer gas-tight can 33 that may be eight-sided as shown. The flanges 25 loosely engaging the three-sided ends of the outer can position the inner can and hold it against lateral movement.

In the space between the inner and outer cans we mount the electrolyte container, which consists preferably of a flexible bag 34 that may be formed of any suitable flexible and/or resilient material that is resistant to chemical action of the electrolyte employed. A measured amount of electrolyte is placed in the bag, sufficient to fill the battery. In some cases electrolyte constitutents in a dry state will be placed within the battery, in which event the bag 34 will contain water. When reference is made hereinafter to the storage of electrolyte in bag 34 it should be understood to comprehend the storage of water merely. In order to prevent collapsing action of the bag from interfering with electrolyte flow, we provide a rigid fitting 35 the pressure-resisting walls of which have a number of radial passages 36 connecting with a longitudinal passage 37. The fitting 35 also has an external constriction to which a portion of neck 38 of the bag is fastened by means of a wire clamp 39. This neck 38 constitutes part of a flexible portion of the passage previously mentioned and, as shown, is integral with the bag 34.

A diaphragm 40 made preferably of thin metal is sealed across an end of the elbow fitting 31. A further flexible wall portion 41 of the electrolyte passage, also preferably integral with the portions 34 and 38, has an open end which is clamped upon and sealed to the elbow fitting 31 as by a metal band 42. The diaphragm 40 is adapted to be punctured by a piercing element shown as a metal dart 43 that is entirely enclosed within the flexible portion of the conductor and is impelled from outside the conductor by energy releasable means which will now be described.

Secured to the cover 23 of the inner can there is a casting 45 having upwardly extending ears 46 that are transversely slotted to receive an inverted U plate 47 that extends into an annular groove in a cylinder 48, by which means the cylinder is held against movement. Within this cylinder there is guided a squib housing 49. When a squib, not shown, is exploded within the space embraced by the housing 49 and the closed end of cylinder 48, the housing 49 is driven suddenly forward. The rear wall 41 of the passage is flexible and is extended inwardly within a rearwardly projecting skirt 51 of dart 43 and fits over the forward end of housing 49. The dart is thus guided in a straight course toward the diaphragm 40. The squib contains an explosive of suitable character that is ignited by an electric current conveyed into the cylinder 48 by conductors 52 and 53 that are supplied with current from an outside source through the receptacle 16. It will be appreciated that the mounting of the dart in the flexible wall 41 exclusively is not essential, and that instead the wall 41 could surround and be vulcanized to the dart at a point intermediate its ends, the guiding means being disposed entirely outside the electrolyte passage.

Figure 2:
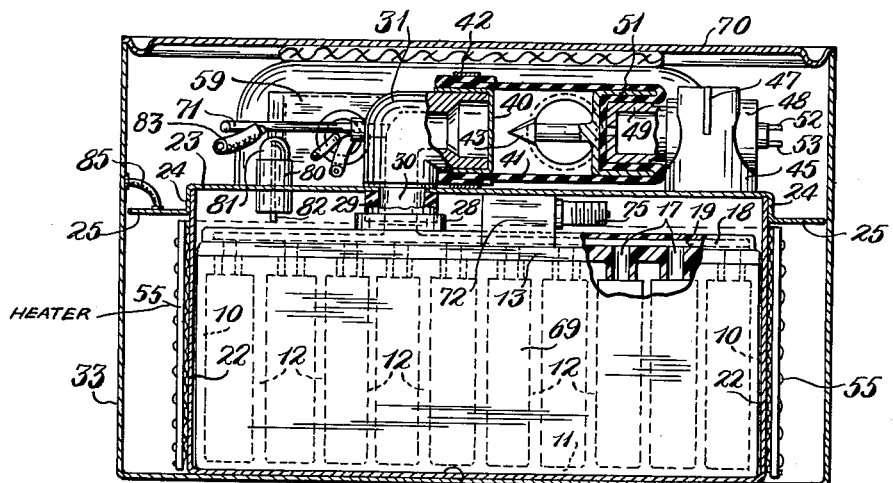
FIG. 2 is an elevational view, partly in vertical section, of the battery unit shown in FIG. 1.
Figure 3:
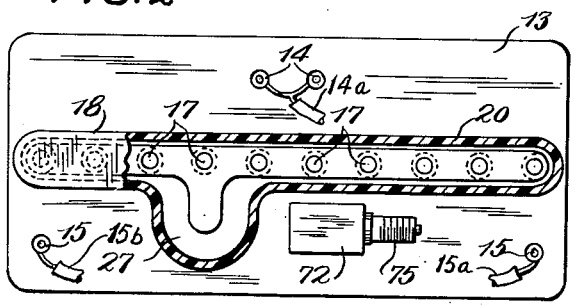
FIG. 3 is a plan view, partly broken away, showing the battery cover and the manifold constituting a part thereof.
Figure 4:
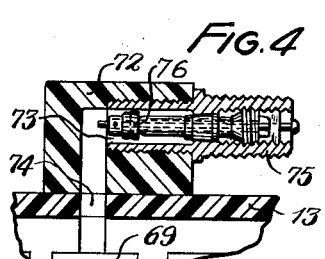
FIG. 4 is a detail sectional view showing a one-way vacuum connection between the battery and the enclosing inner housing.

Means energized from an outside source of electricity are provided for bringing the temperature of the battery and of the electrolyte up to and maintaining it at a predetermined desirable level for optimum operation of the unit. This may include heating coil means 55 extending around the outer wall 22 of the inner can and heating coil means 56 disposed on the outer side of the electrolyte bag 34. A thermostat 57 is mounted on the inner can so as to be affected by the temperature therein and in the battery. A second thermostat affected by the temperature of a metal plate 58 which bears against bag 34 is insulated by cork or equivalent material in a casing 59 so that the action of this latter thermostat will not be affected substantially by the temperature of the battery. Current for the operation of the heaters is supplied from an outside source and enters through one of the prongs of the receptacle 16, passing by a conductor 60 to the thermostat 57 and by a conductor 61 to the electrolyte-thermostat 59. From the thermostat 57, when closed, it passes by a conductor 62 to the heater 55 and back through conductors 63 and 64 to the other side of the source by way of another prong on plug 16. From the electrolyte-thermostat, when closed, current passes through a conductor 65 to the heater 56 and back through conductors 66 and 64 to the plug 16. Conductor 64, as shown, leads to a common connector from which conductors 53, 63 and 66 extend. Heat in the electrolyte bag is conserved by an insulating blanket 67 which extends along the side of the bag and up over the top of the same, as indicated in FIGS. 1 and 2.

The outer can 33 is provided with a cover 70 which fits and is sealed to the side walls of the can. The cover has a perforation therein which is closed and sealed after the entire unit reaches room temperature. By this means the air pressure which is sealed into the can at the time the unit is completed remains there. In many cases this will be a normal atmospheric pressure at or near sea level pressure, and it will be retained even though the battery is taken to great heights as it may be in some instances, for example when it is employed in a guided missile. Thus, there is maintained across the diaphragm 40 a differential of pressure which after rupture of the diaphragm, as later described, is effective for forced flow of electrolyte from the bag 34 into the electrolyte space of the battery.

The battery and the inner can may be evacuated by a conventional vacuum pump which may be connected to a metal tube 71 that extends into the passage through elbow fitting 31 and is sealed therein against leakage. At this time the diaphragm 40 closes off the elbow part of the conductor from the flexible part 41. Vacuum then becomes effective throughout the passage 19 of the manifold 18 and through the ports 17 leading to each of the battery cells. On the cover 13 of the battery there is mounted and cemented a block 72 through which extends an angular passage 73, one end of which communicates with a hole 74 through the top of a cell 69, the other end being in communication with a valve housing 75 similar to that of a tire valve. When sufficient vacuum becomes available in the cell 69 the valve 76 will open against the action of a spring in the valve insides and the air in the can will be exhausted into the cell 69 and thence through the manifold 18, elbow 31 and tube 71 to the pump. When the proper degree of vacuum has been attained the tube 71 is sealed and the pump disconnected.

Means are provided for testing or measuring the degree of vacuum in the inner can and hence in the battery. For this purpose we employ an electrical means for measuring the current in a high voltage circuit having a gap the resistance of which is proportional to the degree of vacuum. A metal tube 80 extends through a hole in the cover 23 of the inner can, the joint being sealed of course. At the axis of the tube there is sealed into a glass or other insulation ball 81 a wire electrode 82. This wire is connected with a heavily insulated conductor 83 which extends through and is insulated from the outer can 33, the projecting end having a terminal 84. The grounded tube 80 is connected by means of a conductor 85 with the side wall of the outer can. A high voltage circuit may be connected across the terminal 84 and the grounded can. An electric meter, calibrated in terms of inches of mercury, may be used to measure the current flow which varies in a straight line with the vacuum, i.e., decreases with increasing vacuum. With the arrangement used the test for vacuum may be conducted either at the time of the production of the unit or at some later time if there is reason to doubt that the necessary degree of vacuum has been retained. The electrical means for measuring the vacuum in the inner can will be hereinafter referred to as comprising a vacuum indicating means.

All necessary electrical connections other than the high voltage connections just mentioned may be made through the plug receptacle 16. When the battery is to be put into use, manual or automatic switch means is closed to cause the heaters 55 and 56 to be energized. After a predetermined length of time sufficient to bring the battery and the electrolyte to the desired temperature another switch is closed, either manually or automatically to cause current from an outside source to flow through conductors 52, 53, thereby causing the squib to explode and propelling the dart vigorously toward the diaphragm 40. The diaphragm is punctured by this means, whereupon the pressure in the outer can collapses the bag 34 and forces the electrolyte through the passage into the evacuated battery. Thus there is transfer of the measured amount of electrolyte from the bag 34 to the cells of the battery. The passage and bag, then free of electrolyte, form a gas-receiving electrolyte-free space in communication with the battery. The valve 76 closes at this time and prevents electrolyte from flowing out of the battery container into the inner can. Because of the manifold all of the cells are filled with electrolyte regardless of the position of the battery at this time.

Under some conditions the outer can 33 may be omitted, the atmospheric pressure surrounding the unit at the time being relied upon to collapse the electrolyte container. As a further alternative construction, the electrolyte container may be made of material both flexible and resilient and inflated with the electrolyte. In this event, when the seal is broken between the battery and electrolyte container, the contraction of the electrolyte container to its normal size, which preferably will be quite small, will force or help to force the electrolyte into the battery.

From the foregoing description of the preferred embodiment of the invention, it will be apparent that the objects heretofore enumerated and others have been accomplished and that there has been provided a deferred action type battery unit including a separate electrolyte container so constructed and arranged that the electrolyte can be quickly and positively discharged into the battery container and evenly distributed in the various cells as desired.

While the preferred embodiment has been illustrated and described in considerable detail, the invention is not limited to the particular construction shown; for example, the squib or explosive charge could be arranged to open a valve in the conduit between the battery and electrolyte container, if desired, instead of piercing a partition or wall. Other modifications of the preferred construction shown will occur to those skilled in the art to which the invention relates and it is the intention to cover hereby all such modifications that come within the scope of the appended claims.

Having thus described our invention, we claim:

1. In a deferred action battery, an elongated battery container, battery cells disposed side by side within the container, a cover sealed to the container, said cover having filling ports disposed in line with the different cells and having a manifold sealed to the cover extending lengthwise of said ports, a sealed collapsible electrolyte bag and a flow passage from said bag to said manifold, a diaphragm across said flow passage normally preventing flow of electrolyte into the battery, means in communication with the flow passage on the battery side of said diaphragm for evacuating the air from said manifold and from the battery cells in communication therewith, and means for puncturing said diaphragm, whereby atmospheric pressure will collapse said bag and force electrolyte into the evacuated cells of the battery.

2. In combination, a deferred action battery of the type including an electrolyte space free of electrolyte, a collapsible bag having stored therein battery electrolyte, a common housing for said battery and said bag, a flow passage extending between said bag and the electrolyte space of the battery for flow of electrolyte from said bag to said battery, sealing means for said bag and said battery including a diaphragm extending across said passage for storage of said electrolyte in said bag and in that part of said passage extending from the bag to said diaphragm under a materially higher fluid pressure than the fluid pressure in said electrolyte space, and means including an explosive element within said common housing which upon detonation produces within the confines of said flow passage rupture of said diaphragm to make effective a differential of pressure between said bag and said battery for forced flow of electrolyte into said electrolyte space.

3. In combination, a deferred action battery of the type including an electrolyte space free of electrolyte, a flexible container collapsible by pressure and having stored therein battery electrolyte, a common housing for said battery and said container, a flow passage extending between said container and the electrolyte space of the battery for flow of electrolyte from said container to said battery, sealing means for said container and said battery including a diaphragm extending across said passage for storage of said electrolyte in said container, and means including an explosive element within said common housing which upon detonation produces rupture of said diaphragm to open said passage for producing forced flow of electrolyte into said electrolyte space.

4. The combination of claim 3 in which said rupturing means is a diaphragm-piercing element bodily movable within said flow passage through said diaphragm.

5. The combination of claim 4 in which said element is provided with guiding walls and in which said flow passage includes a flexible wall cooperating with said guiding walls to guide said piercing element in a path extending through said diaphragm.

6. The combination of claim 3 in which said piercing means includes an element having guiding walls disposed wholly within said passage, at least one wall of said passage being flexible, and actuating means disposed externally of said flexible wall actuated upon detonation of said explosive element for moving said wall and said piercing element along a path which extends through said diaphragm.

7. The combination of claim 6 in which said actuating means comprises a gas operated piston and in which said piston is actuated by gas under pressure developed by said detonation of said explosive element in a cylinder in which said piston is disposed.

8. The combination of claim 3 in which structure is disposed between said diaphragm and said explosive element, which structure is displaced upon detonation of said element to rupture said diaphragm.

9. The combination of claim 3 in which said explosive element is disposed in a position within said housing generally opposite said diaphragm and separated therefrom by at least a part of said electrolyte.

10. The combination of claim 9 in which said explosive element upon detonation thereof applies the diaphragm-rupturing force to a wall portion of said bag.

11. The combination of claim 3 in which said battery includes a plurality of cells and in which a distributing manifold having openings respectively in communication with the top of each cell forms a part of said passage for flow of electrolyte to all of said cells.

12. The combination of claim 3 in which said forced flow of said electrolyte is produced by a differential of pressure established by sealing said battery after partial evacuation of the battery and of that part of the flow passage extending between said battery and the battery-side of said sealing means.

13. The combination of claim 3 in which heating means are provided for said container and said battery for elevating the temperature of said electrolyte and of said battery prior to flow of electrolyte into said battery.

14. The combination of claim 3 in which said battery is sealed after evacuation thereof, and in which said common housing contains air at normal atmospheric pressure for developing and maintaining a differential of pressure across said diaphragm.

15. In combination, a deferred action battery of the type including an electrolyte space free of electrolyte for a plurality of cells, a sealed collapsible bag having therein a measured quantity of electrolyte for said battery, walls forming a flow passage extending between said bag and the electrolyte space of said battery for flow of electrolyte from said bag to said battery, sealing means normally closing said passage to prevent said flow of electrolyte to said battery, said battery and that part of the flow passage extending from said cells to said sealing means being sealed to atmosphere after at least partial evacuation thereof for establishment of a differential of pressure across said sealing means with the lower pressure on the battery-side thereof, said collapsible bag having applied to the walls thereof a fluid pressure materially in excess of that within said battery for establishing said differential of pressure for forced flow of electrolyte from said bag to said electrolyte space, and means for opening said sealing means while maintaining said differential of pressure for producing said forced flow of said electrolyte into said electrolyte space.

16. In combination, a deferred action battery of the type including an electrolyte space free of electrolyte, a collapsible bag having stored therein battery electrolyte, a common housing for said battery and said bag, a flow passage extending between said bag and the electrolyte space of said battery for flow of electrolyte from said bag to said battery, said flow passage having rigid walls in at least the region of its entrance into said bag to maintain open the flow passage during collapse of said collapsible bag, sealing means for said bag, said battery, and said common housing, said sealing means including a diaphragm extending across said passage for storage of said electrolyte in said bag and in said common housing, and means disposed within said sealed common housing for rupturing said diaphragm for forced flow of electrolyte into said electrolyte space.

References Cited in the file of this patent
UNITED STATES PATENTS

| | | |
|---|---|---|
| 2,252 | Rand | Sept. 11, 1841 |
| 1,575,567 | Geake | Mar. 2, 1926 |
| 2,134,489 | Scherer | Oct. 25, 1938 |
| 2,404,144 | Riggs | July 16, 1946 |
| 2,452,049 | Hauck | Oct. 26, 1948 |
| 2,529,511 | Murphy | Nov. 14, 1950 |
| 2,594,879 | Davis | Apr. 29, 1952 |
| 2,626,971 | Mansoff | Jan. 27, 1953 |